(12) United States Patent
Yamada et al.

(10) Patent No.: US 7,668,056 B2
(45) Date of Patent: Feb. 23, 2010

(54) WARPAGE ANGLE MEASUREMENT APPARATUS AND WARPAGE ANGLE MEASUREMENT METHOD FOR OPTICAL RECORDING MEDIUM

(75) Inventors: Takashi Yamada, Tokyo (JP); Tsuyoshi Komaki, Tokyo (JP)

(73) Assignee: TDK Corporation, Tokyo (JP)

( * ) Notice: Subject to any disclaimer, the term of this patent is extended or adjusted under 35 U.S.C. 154(b) by 412 days.

(21) Appl. No.: 10/569,209

(22) PCT Filed: Aug. 26, 2004

(86) PCT No.: PCT/JP2004/012302
§ 371 (c)(1),
(2), (4) Date: Feb. 23, 2006

(87) PCT Pub. No.: WO2005/022526
PCT Pub. Date: Mar. 10, 2005

(65) Prior Publication Data
US 2006/0280085 A1    Dec. 14, 2006

(30) Foreign Application Priority Data
Aug. 27, 2003  (JP) .............................. 2003-302528

(51) Int. Cl.
*G11B 7/00* (2006.01)
*G01B 11/26* (2006.01)

(52) U.S. Cl. ................. 369/53.14; 369/116; 369/53.19

(58) Field of Classification Search .............. 369/53.18, 369/53.19, 44.32, 44.41, 116; 720/651; 360/97.02, 360/137
See application file for complete search history.

(56) References Cited

U.S. PATENT DOCUMENTS

| | | | |
|---|---|---|---|
| 4,831,476 A * | 5/1989 | Branc et al. ................. | 720/651 |
| 5,182,742 A * | 1/1993 | Ohmori et al. ............... | 369/116 |
| 6,157,600 A * | 12/2000 | Nakamura et al. ........ | 369/44.32 |
| 6,208,601 B1 * | 3/2001 | Shimizu et al. ........... | 369/53.19 |
| 7,327,643 B2 * | 2/2008 | Iwazawa et al. .......... | 369/44.32 |

FOREIGN PATENT DOCUMENTS

| | | |
|---|---|---|
| JP | A 64-1904 | 1/1989 |
| JP | A 04-276354 | 10/1992 |
| JP | U 05-90656 | 12/1993 |
| JP | A 08-233543 | 9/1996 |
| JP | A 10-078310 | 3/1998 |
| JP | A 2001-041718 | 2/2001 |
| JP | A 2001-257461 | 9/2001 |
| JP | A 2002-313050 | 10/2002 |
| JP | A 2003-059097 | 2/2003 |
| JP | A 2003-085836 | 3/2003 |
| JP | A 2003-091883 | 3/2003 |
| JP | A 2003-132591 | 5/2003 |
| JP | A 2003-132596 | 5/2003 |

* cited by examiner

*Primary Examiner*—William J Klimowicz
*Assistant Examiner*—Kim-Kwok Chu
(74) *Attorney, Agent, or Firm*—Oliff & Berridge, PLC

(57) ABSTRACT

A warpage angle measurement apparatus and a warpage angle measurement method are provided that can measure an angle of warpage of an optical disc and a cartridge for the optical disc caused by a rapid environmental change such as a temperature change or a humidity change in a short time. The warpage angle measurement apparatus 10 includes: a constant temperature chamber 22 for accommodating an optical recording medium 20 formed by mounting the optical disc 16 as an object to be measured in the cartridge 18 and for adjusting a surrounding of the optical recording medium 20 to have a predetermined environmental condition; a laser oscillator 24 for causing laser oscillation to emit laser light to the optical disc 16; and a light-receiving unit 26 for receiving the laser light reflected from the optical disc 16 and detecting a relative angle of an optical path L2 of the reflected laser light with respect to an optical path L1 of the emitted laser light.

5 Claims, 6 Drawing Sheets

WARPAGE ANGLE MEASUREMENT APPARATUS AND WARPAGE ANGLE MEASUREMENT METHOD FOR OPTICAL RECORDING MEDIUM

TECHNICAL FIELD

The present invention relates to a warpage angle measurement apparatus and a warpage angle measurement method for measuring an angle of warpage of an optical disc and a cartridge for the optical disc.

BACKGROUND ART

Shortening of the wavelength of laser light and increasing of the numerical aperture NA of an objective lens can increase recording density and recording capacity in an optical disc. On the other hand, as the wavelength of the laser light is shorter and the numerical aperture of the objective lens is larger, there is a tendency that coma aberration is generated and reduces accuracy of recording and reproducing information. However, margin for tilt (warpage) of the optical disc can be ensured by making a light-transmitting layer of the optical disc thin, thus ensuring the accuracy of recording and reproducing information.

In recent years, an optical disc has attracted attention, in which blue-violet laser light having a wavelength as short as about 405 nm is used and numerical aperture NA is increased up to about 0.85 in order to largely increase the recording capacity. A light-transmitting layer having a thickness of about 0.1 mm that is thinner than a substrate having a thickness of about 1.1 mm is formed in accordance with the above wavelength and NA (see Japanese Patent Laid-Open Publication No. 2003-85836, for example).

This type of optical disc has high recording density and therefore the accuracy of recording and reproducing information is easily affected by dust, scar, or the like. Thus, a cartridge in the form of a thin box is prepared. The cartridge has an opening for transmitting information to/from the optical disc. The optical disc can be used in recording and/or reproduction equipment while being mounted on the cartridge. Moreover, another type of cartridge that has the opening for transmitting information and another opening for allowing printing to be preformed on the optical disc and/or allowing the optical disc to be removed and inserted therethrough.

In this type of optical disc, the numerical aperture NA of the objective lens is increased up to about 0.85 as described above, and a distance between the objective lens and the optical disc is shortened in accordance with the increased NA, as compared with a conventional optical disc such as CD (Compact Disc) and DVD (Digital Versatile Disc). Thus, there is a tendency that warpage causes interference between the optical disc and the objective lens more easily in this type of optical disc than in the conventional optical disc, even if the degree of the warpage is the same.

This type of optical disc is manufactured by forming a light-transmitting layer by spin coating on a substrate formed by injection molding, for example. Thus, the substrate and the light-transmitting layer are different in thickness and manufacturing method, and are sometimes different in material. Therefore, this type of optical disc has a problem that warpage can easily occur with a rapid change in a temperature or a humidity.

For example, when an optical disc that is placed in an outdoor location in winter and is therefore cooled down to a temperature close to an outside air temperature is mounted on a video camera or the like that is heated by being turned on, an environmental temperature of the optical disc increases by several tens of degrees C. in several seconds and warpage may occur. Moreover, when an optical disc that is placed in an outdoor location in summer and is therefore heated to a temperature close to an outside air temperature is mounted on a recording and reproduction device or the like that is placed and cooled in an air-conditioned room, an environmental temperature of the optical disc lowers by several tens of degrees C. in several seconds and warpage may occur. Large warpage can easily cause an error in reading and reproduction of information. Therefore, an angle of warpage should be suppressed within a predetermined limit value.

It is possible to suppress the angle of warpage within the predetermined limit value by making various improvements, for example, forming a layer having a coefficient of linear expansion equal to that of the light-transmitting layer on an opposite surface of the substrate to the light-transmitting layer.

However, even in the case where the warpage of the optical disc only is suppressed within the predetermined limit value, when that optical disc is mounted in the cartridge, warpage exceeding the predetermined limit value may occur in the optical disc in the cartridge or warpage of the cartridge may occur. That warpage may cause an error in reading and reproduction of information.

In order to develop a highly reliable optical recording medium in which the angle of warpage of the optical disc and the cartridge is suppressed, it is important to quantitatively understand the angle of warpage caused by a rapid temperature change or a rapid humidity change of the optical disc mounted in the cartridge or the cartridge that occurs in a short time.

However, in the conventional optical disc such as CD and DVD, the numerical aperture of the objective lens is small and there is a sufficient distance between the optical disc and the objective lens. Thus, warpage caused by a rapid temperature change or a rapid humidity change in a short time does not become a problem. Therefore, there is no method for measuring an angle of warpage of an optical recording medium caused by a rapid temperature change or a rapid humidity change occurring in a short time.

Moreover, there is no method for measuring an angle of warpage of an optical disc while the optical disc is mounted in a cartridge.

DISCLOSURE OF THE INVENTION

In view of the foregoing problems, various exemplary embodiments of this invention provide a warpage angle measurement apparatus and a warpage angle measurement method for an optical recording medium, which can measure an angle of warpage of an optical disc and a cartridge for the optical disc that is caused by a rapid temperature change or a rapid humidity change in a short time.

According to the present invention, at least one of an optical disc and a cartridge for the optical disc is accommodated as an object to be measured in a constant temperature chamber, a surrounding of the object to be measured is adjusted to have a predetermined environmental condition, and an angle of warpage of the object to be measured is measured by emitting laser light to the object to be measured, receiving the laser light reflected from the object to be measured, and detecting a relative angle of an optical path of the reflected laser light with respect to an optical path of the emitted laser light. Thereby, the problems described above can be solved.

The object to be measured may be accommodated in one constant temperature chamber and the environmental condition may be rapidly changed. Alternatively, two constant temperature chambers may be used and environmental conditions inside those constant temperature chambers may be set to be different from each other. In this case, when the object to be measured is first placed in one of the two constant temperature chambers and is then carried into the other constant temperature chamber, it is possible to rapidly change the environmental condition of the optical disc in a short time and measure the angle of warpage of the object to be measured.

In summary, the above-described objectives are achieved by the following aspects of embodiments.

(1) A warpage angle measurement apparatus comprising:

a constant temperature chamber for accommodating at least one of an optical disc and a cartridge for the optical disc as an object to be measured and adjusting a surrounding of the object to be measured to have a predetermined environmental condition; a laser transmitter for causing laser oscillation to emit laser light to the object to be measured; and a light-receiving unit for receiving the laser light reflected from the object to be measured and detecting a relative angle of an optical path of the reflected laser light with respect to an optical path of the emitted laser light.

(2) The warpage angle measurement apparatus according to (1), further comprising an arithmetic unit for calculating the relative angle of an optical path of the reflected laser light with respect to an optical path of the emitted laser light based on a position on the light-receiving unit at which the reflected laser light arrives.

(3) The warpage angle measurement apparatus according to (1) or (2), wherein the constant temperature chamber has a through hole for allowing the laser light to pass therethrough, and the laser transmitter and the light-receiving unit are arranged outside the constant temperature chamber.

(4) The warpage angle measurement apparatus according to (3), wherein the through hole of the constant temperature chamber is closed with a light-transmitting member.

(5) The warpage angle measurement apparatus according to any one of (1) to (4), further comprising a mounting posture adjusting mechanism for holding the optical disc and the cartridge in the constant temperature chamber while the optical disc is mounted in the cartridge and for adjusting a mounting posture of the optical disc in the cartridge.

(6) The warpage angle measurement apparatus according to any one of (1) to (5), further comprising a rotating and driving mechanism for driving the optical disc to rotate.

(7) A warpage angle measurement method comprising: accommodating at least one of an optical disc and a cartridge for the optical disc as an object to be measured in a constant temperature chamber; adjusting an inside of the constant temperature chamber to have a predetermined environmental condition; and measuring an angle of warpage of the object to be measured by emitting laser light to the object to be measured, receiving the laser light reflected from the object to be measured, and detecting a relative angle of an optical path of the reflected laser light with respect to an optical path of the emitted laser light.

(8) The warpage angle measurement method according to (7), wherein a through hole for allowing laser light to pass therethrough is provided in the constant temperature chamber so that the laser light is emitted from an outside of the constant temperature chamber to the object to be measured and the reflected laser light from the object to be measured is received in the outside of the constant temperature chamber.

(9) The warpage angle measurement method according to (8), wherein the through hole of the constant temperature chamber is closed with a light-transmitting member so that the angle of warpage of the object to be measured is measured.

(10) The warpage angle measurement method according to any one of (7) to (9), wherein the optical disc and the cartridge are held in the constant temperature chamber while the optical disc is mounted in the cartridge, and a mounting posture of the optical disc in the cartridge is adjusted to measure the angle of warpage of the optical disc.

(11) The warpage angle measurement method according to any one of (7) to (10), wherein the angle of warpage of the optical disc is measured while the optical disc is driven to rotate.

(12) The warpage angle measurement method according to any one of (7) to (11), wherein the laser light is emitted to the optical disc through an opening for transmitting information of the optical disc provided in the cartridge while the optical disc is mounted in the cartridge, and the reflected laser light from the optical disc is reflected to an outside of the cartridge.

(13) The warpage angle measurement method according to any one of (7) to (11), wherein an opening for measurement is formed in the cartridge, the laser light is emitted to the optical disc through the opening for measurement while the optical disc is mounted in the cartridge, and the reflected laser light from the optical disc is reflected to an outside of the cartridge.

(14) The warpage angle measurement method according to any one of (7) to (13), wherein two constant temperature chambers are prepared and environmental conditions inside the two constant temperature chambers are set to have a different environmental condition from each other, and the object to be measured is first accommodated in one of the two constant temperature chambers and is then carried into the other constant temperature chamber and thereafter the angle of warpage of the object to be measured is measured.

BEST MODE FOR CARRYING OUT THE INVENTION

Preferred exemplary embodiments of the present invention will now be described in detail, with reference to the drawings.

Figure 1:
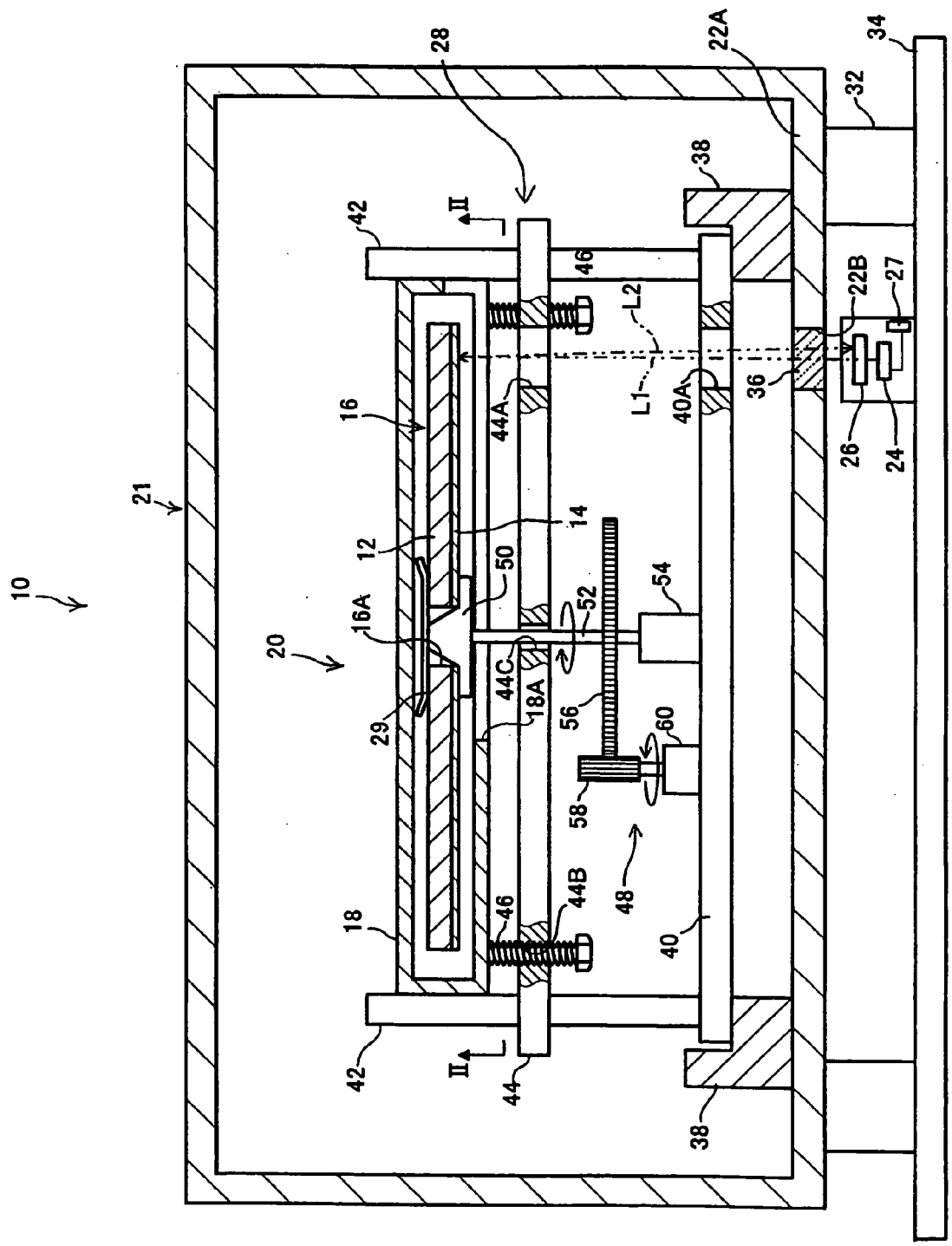
FIG. 1 is a cross-sectional side view schematically showing an entire structure of a warpage angle measurement apparatus for an optical recording medium according to a first exemplary embodiment of the present invention.

As shown in FIG. 1, a warpage angle measurement apparatus 10 includes: a constant temperature chamber 21 for accommodating an optical recording medium 20 in which an optical disc 16 as an object to be measured, which has a light-transmitting layer 14 thinner than a substrate 12, is mounted in a cartridge 18 so as to adjust the surrounding of the optical recording medium 20 to have a predetermined environmental condition; a laser oscillator 24 for causing laser oscillation to emit laser light to the optical disc 16; and a light-receiving unit 26 for receiving the laser light reflected from the optical disc 16 and detecting a relative angle of an optical path L2 of the reflected laser light with respect to an optical path L1 of the emitted laser light.

The warpage angle measurement apparatus 10 also includes an arithmetic unit 27 for calculating the relative angle of the optical path L2 of the reflected laser light with respect to the optical path L1 of the emitted laser light based on a position on the light-receiving unit 26 at which the reflected light arrives.

The warpage angle measurement apparatus 10 further includes a mounting posture adjusting mechanism 28 for holding the optical disc 16 and the cartridge 18 in the constant temperature chamber 21 while the optical disc 16 is mounted on the cartridge 18 and for adjusting a mounting posture of the optical disc 16 in the cartridge 18.

The optical disc 16 is a circular plate having a thickness of approximately 1.2 mm and an outer diameter of approximately 120 mm. A central hole 16A having an inner diameter of approximately 15 mm is formed in the optical disc 16. The substrate 12 has a thickness of approximately 1.1 mm and the light-transmitting layer 14 has a thickness of approximately 0.1 mm.

The substrate 12 is formed from a resin such as polycarbonate by injection molding. A fine concavity and a fine convexity (both not shown) serving as a pit, a groove, and the like for transmitting information are transferred onto a surface of the substrate 12 on the light-transmitting layer 14 side. In general, the terms "pit" and "groove" are used to mean a concave portion used for transmitting information. However, in this description, those terms are used to mean not only the concave portion but also a convex portion, as long as that convex portion is formed for the purpose of transmitting information, for convenience.

A magnetic plate 29 is arranged on a surface of the substrate 12 that is opposite to the light-transmitting layer 14 around a center.

The light-transmitting layer 14 is formed from a light-transmitting resin that can be hardened by radiation such as ultraviolet rays or electron beams. The light-transmitting layer 14 is formed by spreading the resin on the substrate 12 by spin coating or the like and then hardening the resin by being irradiated with radiation. Alternatively, the light-transmitting layer 14 may be formed by bonding a light-transmitting film formed of polycarbonate or the like to the substrate 12.

A functional layer (not shown) is formed between the substrate 12 and the light-transmitting layer 14. For example, when the disc is a ROM (Read Only Memory) type, a reflective layer is formed as the functional layer. When the disc is an RW (Re-Writable) type, a reflective layer and a layer of a phase change material are formed.

Figure 2:
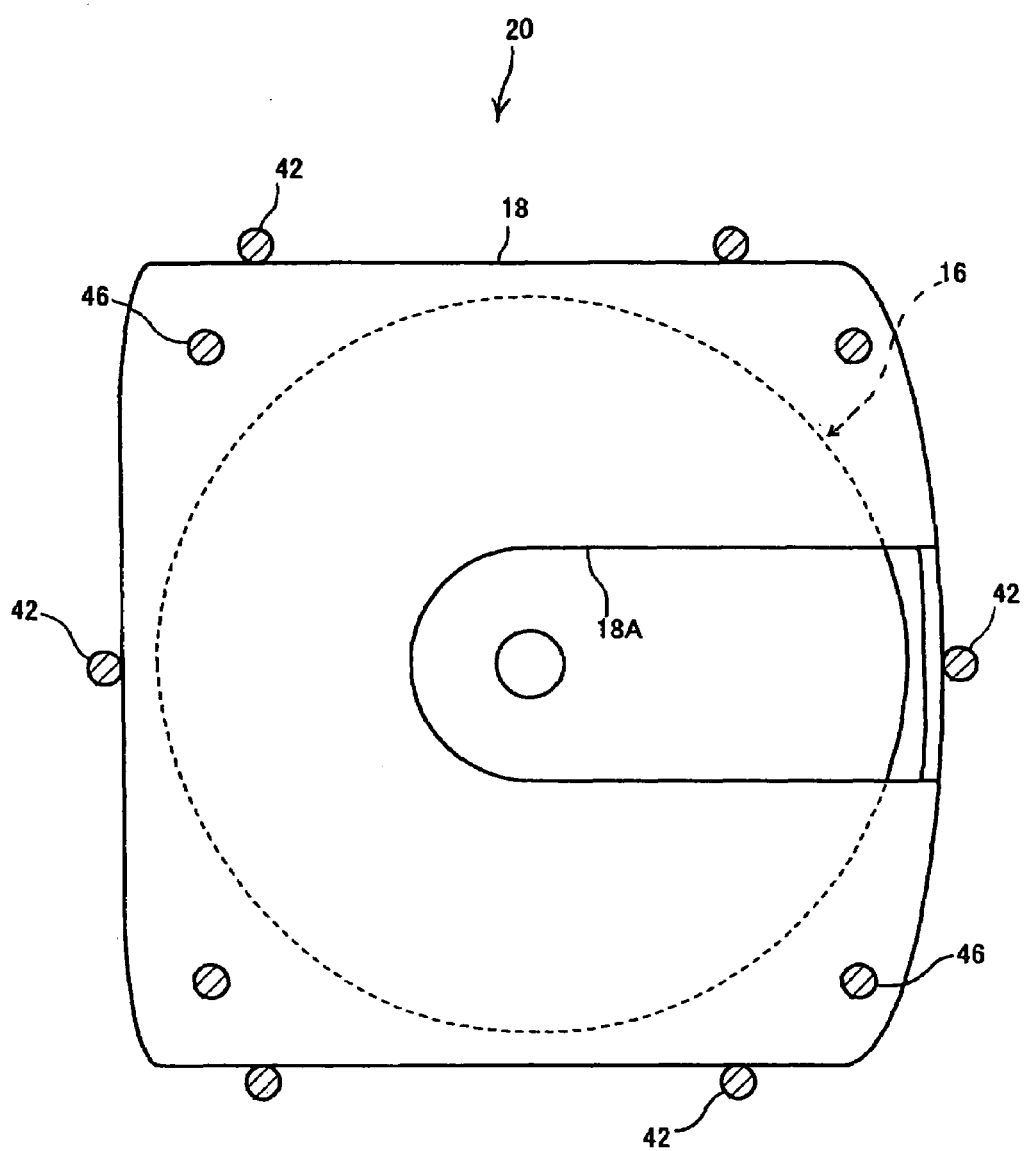
FIG. 2 is a bottom cross-sectional view, taken along the line II-II in FIG. 1.

The cartridge 18 is an approximately square thin box, as shown in FIG. 2, and is closed on one side (an upper side in FIG. 2) in a thickness direction. A communication opening 18A used for transmitting information of the optical disc 16 is provided on the other side in the thickness direction.

The constant temperature chamber 21 is an approximately box-like member and includes a temperature adjusting device, a humidity adjusting device, or the like (not shown). An environmental condition such as a temperature or humidity inside the constant temperature chamber 21 is adjustable. The constant temperature chamber 21 is supported by a base 34 via a supporting post 32. A gap is formed between a bottom plate 22A of the constant temperature chamber 21 and the base 34.

The bottom plate 22A has a through hole 22B formed therein for allowing laser light to pass therethrough. The through hole 22B is closed with a light-transmitting member 36 formed of glass, acrylic resins, or the like. A placing portion 38 onto which the mounting posture adjusting mechanism 28 is to be placed is provided on a top surface of the bottom plate 22A.

The laser oscillator 24 is arranged outside the constant temperature chamber 22 under the through hole 22B and is attached onto the base 34 to emit laser light to the inside of the constant temperature chamber 21 through the through hole 22B. The laser oscillator 24 is arranged in such a manner that an angle of emission of the laser light is adjustable.

The light-receiving unit 26 is also arranged outside the constant temperature chamber 21 under the through hole 22B. The light-receiving unit 26 includes a CCD device, for example, and can detect a position at which reflected light arrives.

The arithmetic unit 27 is connected to the light-receiving unit 26 by cable. The arithmetic unit 27 may be arranged near the light-receiving unit 26 or at a position away from the light-receiving unit 26 via a lead wire or the like. Alternatively, an arithmetic unit that is separate from the warpage angle measurement apparatus 10, e.g., a general computer may be used.

The mounting posture adjusting mechanism 28 includes: a base plate 40; a plurality of (six in the present exemplary embodiment) supporting columns 42 projecting upward from the base plate 40; an intermediate plate 44 supported at a portion near an intermediate level of the supporting columns 42 in a vertical direction; a plurality of (four in the present embodiment) screw members 46 that are screwed with the intermediate plate 44 and have tops projecting upward from the intermediate plate 44; and a rotating and driving mechanism 48 for holding the optical disc 16 and driving the optical disc 16 to rotate.

The base plate 40 is a plate-like member having such a shape that the base plate 40 is freely fitted into the placing portion 38 of the constant temperature chamber 21. A through hole 40A for allowing laser light to pass therethrough is formed in the base plate 40 at a position above the through hole 22B of the constant temperature chamber 21.

The supporting column 42 is a round-bar member and is arranged to be in contact with or close to a side face of the cartridge 18, thereby holding the cartridge 18 from the side, as shown in FIG. 2.

The intermediate plate 44 has a through hole 44A for allowing laser light to pass therethrough at a position above the through hole 40A of the base plate 40. The intermediate plate 44 also has screw holes 44B with which the screw members 46 are respectively screwed at four locations. The intermediate plate 44 further has a through hole 44C for the rotating and driving mechanism 48 around a center thereof.

The screw members 46 are arranged in such a manner that they are in contact with a lower surface of the cartridge 18 near corners of the cartridge 18 and support the cartridge 18 from beneath. Positions of the tops of the four screw members 46 in the vertical direction are adjusted in an appropriate manner by rotating the screw members 46. In this manner, it is possible to hold the cartridge 18 horizontally and adjust the position at which the cartridge 18 is held in the vertical position.

The rotating and driving mechanism 48 includes a chuck member 50 for engaging with the central hole 16A of the optical disc 16; a shaft member 52 for supporting the chuck member 50 from beneath; a shaft bearing member 54, attached to the base plate 40, for supporting the shaft member 52 to be freely rotatable; a gear 56 attached to the shaft member 52; a pinion 58 that is to be in mesh engagement with the gear 56; and a motor 60 for driving the pinion 58 to rotate.

The chuck member 50 is magnetized. The chuck member 50 is fitted into the central hole 16A of the optical disc 16 and magnetically adheres to the magnetic plate 29 of the optical recording medium 12, thereby holding the optical disc 16.

Next, a method for measuring an angle of warpage of the optical disc 16, that uses the warpage angle measurement apparatus 10, will be described. It is only necessary to prepare one mounting posture adjusting mechanism 28, whereas two constant temperature chambers 21 are prepared.

First, an angle of laser emission of the laser oscillator 24 is adjusted. More specifically, a calibration disc is placed on the chuck member 50 of the mounting posture adjusting mechanism 28. The calibration disc has the same outer diameter and shape as those of the optical disc 16, has a central hole having an inner diameter of about 15 mm, and is formed of glass. The calibration disc is accommodated in the constant temperature chamber 21 together with the mounting posture adjusting mechanism 28. Then, laser light is emitted onto the calibration disc, and the angle of laser emission of the laser oscillator 24 is adjusted so as to make an angle between emitted light and reflected light 0°, i.e., make an optical path of the emitted light coincident with an optical path of the reflected light.

Subsequently, instead of the calibration disc, the optical recording medium 20 is mounted on the mounting posture adjusting mechanism 28. In this mounting, four screw members 46 are rotated in an appropriate manner, thereby holding the cartridge 18 approximately horizontally and adjusting the held position of the cartridge 18 in the vertical direction without bringing both sides of the optical disc 16 into contact with the cartridge 18. This adjustment may be performed inside the constant temperature chamber 21 or outside the constant temperature chamber 21. After the adjustment of the mounting posture is completed, the optical recording medium 20 is detached from the mounting posture adjusting mechanism 28 once.

Two constant temperature chambers 22 are set to have different environmental conditions from each other. For example, a temperature inside one of the constant temperature chambers 22 is adjusted to a low temperature, while a temperature inside the other constant temperature chamber 21 is adjusted to a high temperature.

Subsequently, the optical recording medium 20 is accommodated in one of the constant temperature chambers 22. Thus, the optical recording medium 20 is rapidly heated (or cooled). Since the optical recording medium 20 has the communication opening 18A on only one side of the cartridge 18, a temperature of a surface of the optical disc 16 on a side close to the communication opening 18A becomes close to a surrounding temperature relatively quickly and a temperature of an opposite surface becomes close to the surrounding temperature late. In other words, a temperature distribution in the optical disc 16 temporarily becomes uneven in the thickness direction, thus causing warpage. However, a variation in the temperature distribution in the optical disc 16 becomes smaller with time and the warpage is gradually converged.

Figure 3:
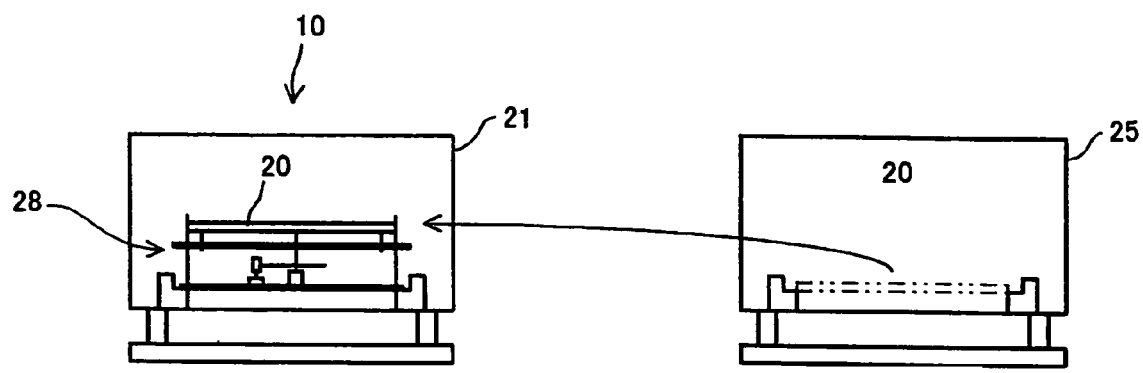
FIG. 3 is a cross-sectional side view schematically showing an example of use of the warpage angle measurement apparatus.

The optical recording medium 20 continues to be accommodated in one constant temperature chamber 21 until the temperature distribution in the optical recording medium 20 becomes sufficiently even. After a state of the optical recording medium 20 becomes stable, the optical recording medium 20 is taken out from that constant temperature chamber 21 and is then mounted on the mounting posture adjusting mechanism 28 inside the second temperature chamber 25 as shown in FIG. 3. Thus, the optical recording medium 20 is rapidly cooled (or heated) and the temperature distribution in the optical disc 16 temporarily becomes uneven in the thickness direction, thus causing warpage.

Figure 4:
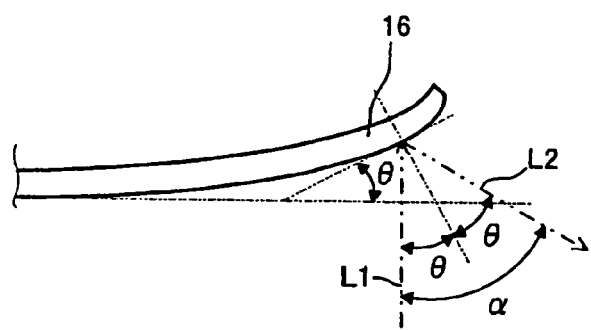
FIG. 4 is an enlarged cross-sectional side view of a surface of an optical disc during a measurement using the warpage angle measurement apparatus.

In this state, when laser light is emitted from the laser oscillator 24 to a portion on the optical disc 16 near an outer circumference of the optical disc 16 through the communication opening 18A of the cartridge 18, the laser light is reflected by a surface of the optical disc 16. However, the surface of the optical disc 16 is inclined with respect to the horizontal direction because of the warpage, as shown in FIG. 4 that shows warpage in an enlarged view. Thus, the optical path L2 of the reflected light is slightly inclined with respect to the vertical direction and is not coincident with the optical path L1 of the emitted light.

The light-receiving unit 26 detects a position at which the reflected light arrives. The arithmetic unit 27 calculates an angle of the optical path L2 of the reflected light based on the position on the light-receiving unit 26 at which the reflected light arrives, and measures an angle formed by the optical path L1 of the emitted light and the optical path L2 of the reflected light as an angle of warpage $\alpha$. Incidentally, assuming that an angle formed by a virtual surface of the optical disc 16 and an actual surface that is measured is $\theta$ in the case where no warpage occurs, $\alpha$ and $\theta$ satisfy the relationship of $\alpha = 2\theta$.

The angle of warpage $\alpha$ may be measured while the optical disc 16 is rotated by means of the rotating and driving mechanism 48. In this case, an average angle of warpage in a circumferential direction, a variation in the angle of warpage in the circumferential direction, and the like can be measured.

Incidentally, the variation in the temperature distribution in the optical disc 16 becomes small with time and the warpage is gradually converged.

As described above, the warpage angle measurement apparatus 10 can measure the angle of warpage of the optical disc 16 while the optical recording medium 20 is accommodated in the constant temperature chamber 21. Thus, it is possible to measure the angle of warpage of the optical disc 16 caused by a rapid change in the environmental condition such as a temperature occurring in a short time in real time. Therefore, the warpage angle measurement apparatus 10 has high reliability.

Moreover, the warpage angle measurement apparatus 10 includes the mounting posture adjusting mechanism 28, and can measure the angle of warpage of the optical disc 16 while the mounting posture of the optical disc 16 in the cartridge 18 is kept without bringing both sides of the optical disc 16 into contact with the cartridge 18. Therefore, the warpage angle measurement apparatus 10 has high measurement precision. In this regard, the reliability of the warpage angle measurement apparatus 10 is improved.

In addition, the warpage angle measurement apparatus 10 includes the rotating and driving mechanism 48 and can measure the angle of warpage of the optical disc 16 while rotating the optical disc 16. Therefore, the warpage angle measurement apparatus 10 can perform various measurements, e.g., a measurement in which a variation in the angle of warpage in the circumferential direction is considered.

Since the laser oscillator 24 and the light-receiving unit 26 are arranged outside the constant temperature chamber 22 in the warpage angle measurement apparatus 10, the laser oscillator 24 and the light-receiving unit 26 are not excessively heated or cooled. In this regard, the warpage angle measurement apparatus 10 has high measurement precision and improved reliability.

In the warpage angle measurement apparatus 10, the through hole 22B of the constant temperature chamber 21 is closed with the light-transmitting member 36 and can be air-tightly sealed from the outside. Therefore, heating efficiency and cooling efficiency are good and the environmental condition can be quickly adjusted.

Since laser light is emitted to the optical disc 16 by using the communication opening 18A of the cartridge 18, preparation for the measurement, such as processing of the optical recording medium 20, is not required. Therefore, it is possible to easily perform the measurement.

Next, a second exemplary embodiment of the present invention will be described.

Figure 5:
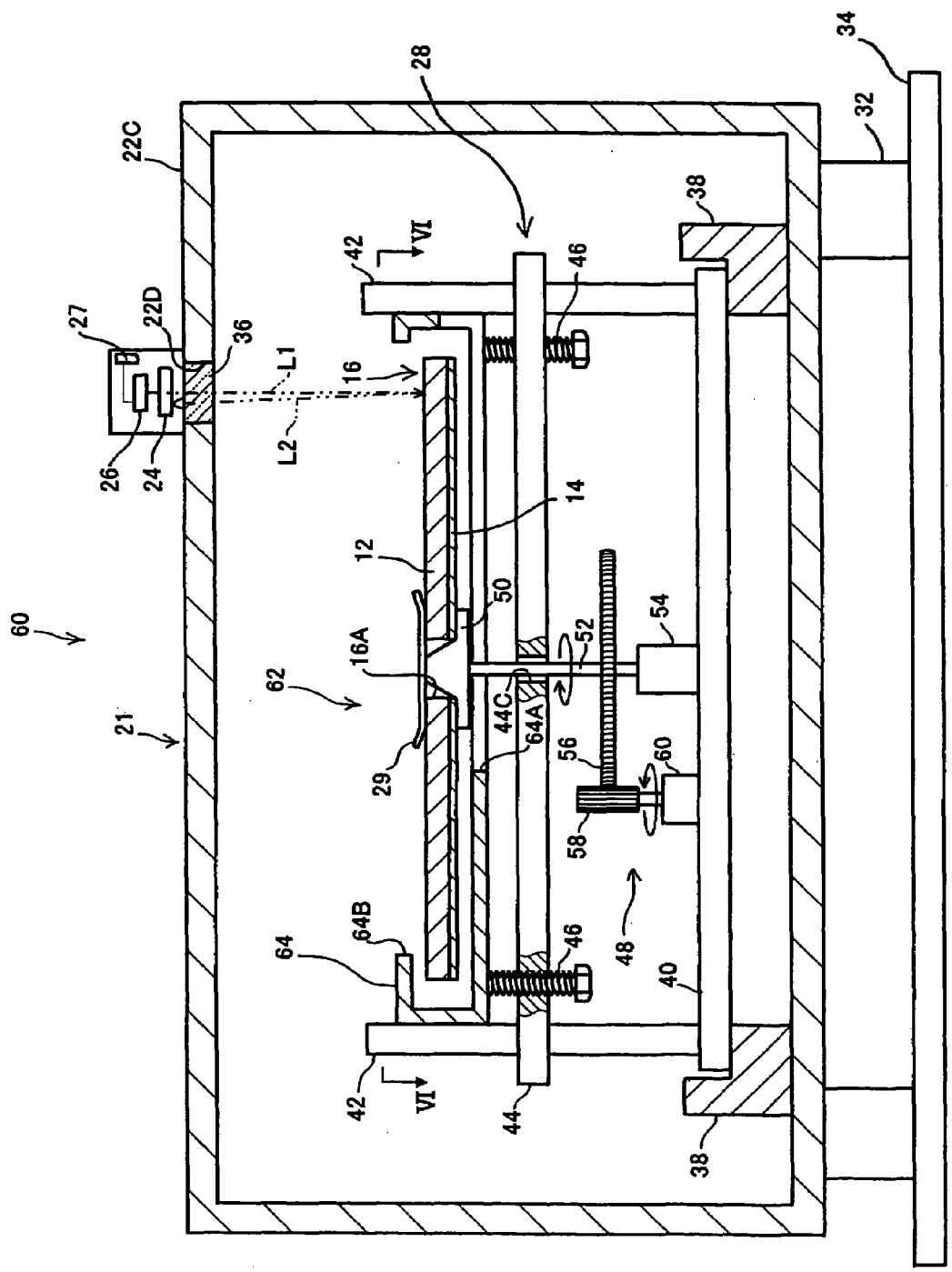
FIG. 5 is a cross-sectional side view schematically showing an entire structure of a warpage angle measurement apparatus for an optical recording medium according to a second exemplary embodiment of the present invention.

In the second exemplary embodiment, a cartridge 64 of an optical recording medium 62 includes a communication opening 64A and an opening 64B for removal and insertion of an optical disc provided on the opposite side to the communication opening 64A, as shown in FIG. 5. Laser light is emitted to the optical disc 16 through the opening 64B for removal and insertion, thereby measuring an angle of warpage of the optical disc 16.

Figure 6:
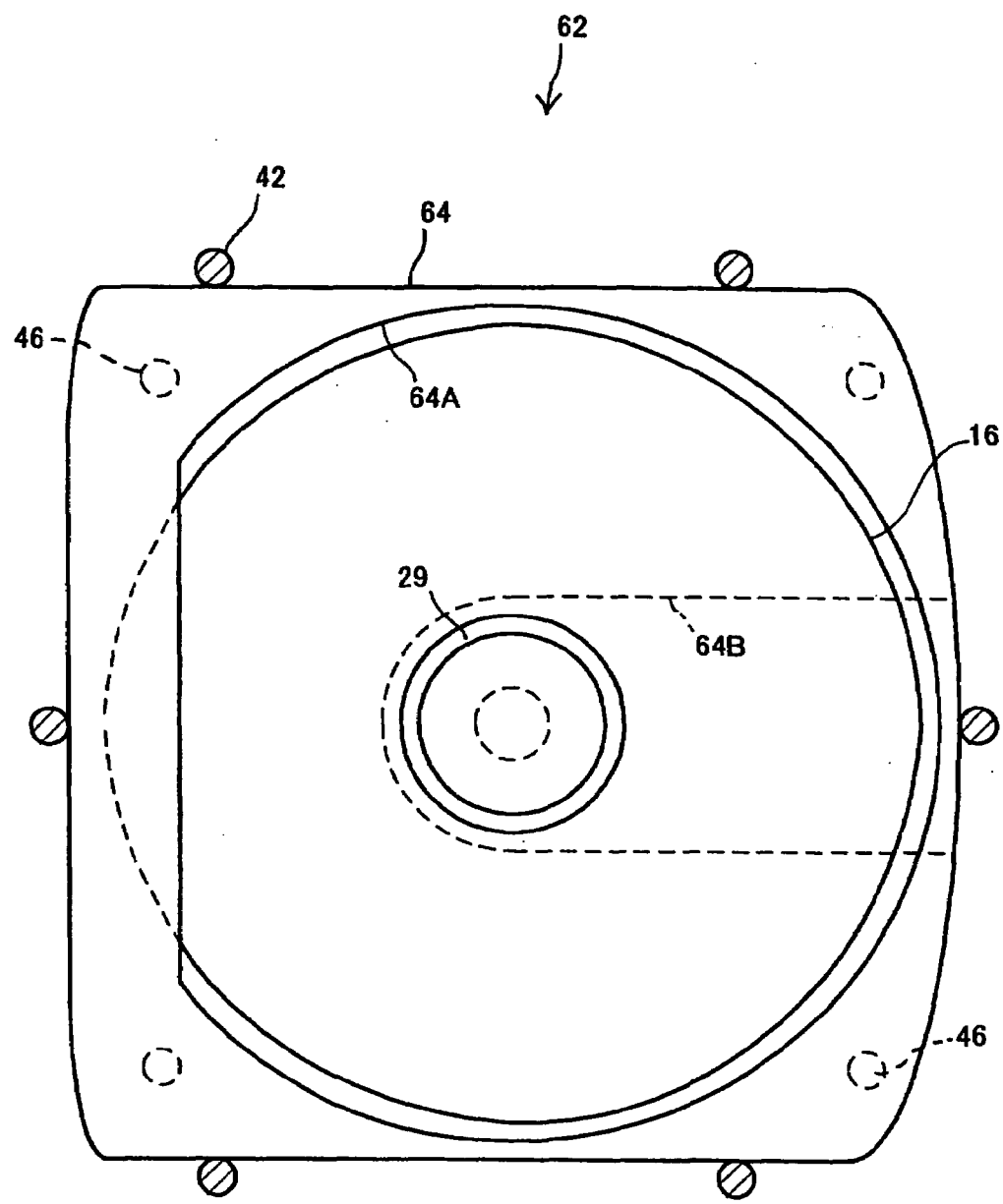
FIG. 6 is a bottom cross-sectional view, taken along the line VI-VI in FIG. 5.

More specifically, the opening 64B for removal and insertion has a shape formed by an arc slightly larger than the optical disc 16 and a straight line near an end (left end in FIG. 6) of the arc, as shown in FIG. 6. The optical disc 16 can be inserted through the opening 64B for removal and insertion. The optical recording medium 62 is arranged to allow the optical disc 16 to be taken out from the cartridge 64. Moreover, printing of a character, a drawing, and the like can be performed on the optical disc 16 through the opening 64B for removal and insertion.

A warpage angle measurement apparatus 60 of the second exemplary embodiment is different from the warpage angle measurement apparatus 10 of the first exemplary embodiment in that a through hole 22D is formed in a top board 22C of the constant temperature chamber 21, the through hole 22D is closed with the light-transmitting member 36, and the laser oscillator 24 and the light-receiving unit 26 are attached above the through hole 22D of the constant temperature chamber 21. No through hole for allowing laser light to pass therethrough is formed in each of the base plate 40 and the intermediate plate 44 of the mounting posture adjusting mechanism 28. Except for the above, the structure of the warpage angle measurement apparatus 60 is the same as that of the aforementioned warpage angle measurement apparatus 10. Therefore, the same structure is labeled with the same reference numerals as those in FIGS. 1 and 2 and the description thereof is omitted. The method for measuring an angle of warpage of the optical disc 16 is also omitted because it is the same as that in the first embodiment.

In the second exemplary embodiment, an angle of warpage of the optical disc 16 caused by a rapid environmental change such as a temperature change or a humidity change occurring in a short time can be measured in real time, as in the first exemplary embodiment. Thus, high reliability can be achieved.

Moreover, laser light is emitted to the optical disc 16 by using the opening 64B provided in the cartridge 64 for removal and insertion of the optical disc 16. Thus, preparation for the measurement, such as processing of the optical recording medium 62, is not required. Therefore, it is possible to easily perform the measurement.

Next, a third exemplary embodiment of the present invention will be described.

Figure 7:
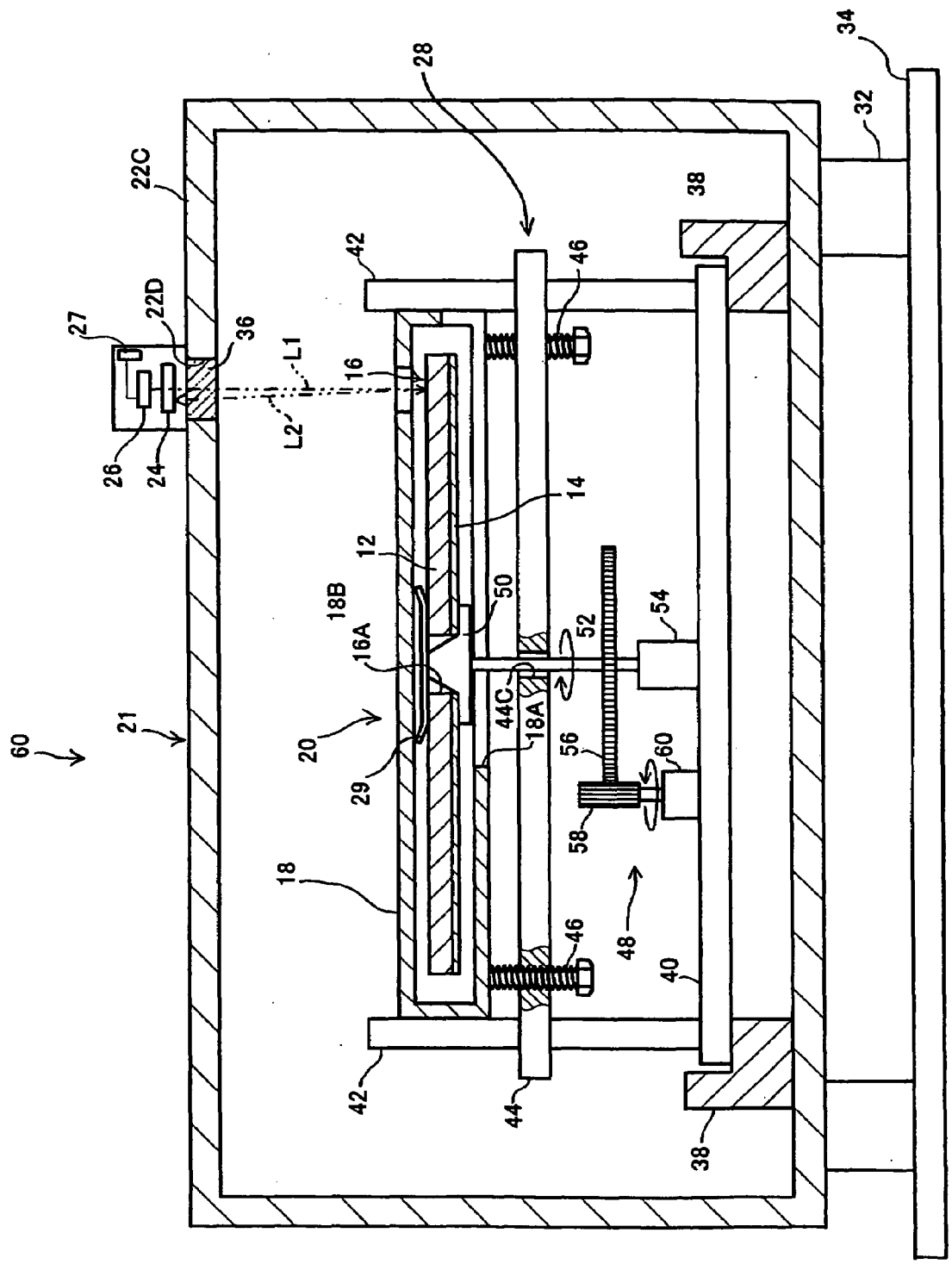
FIG. 7 is a cross-sectional side view schematically showing a warpage angle measurement method for an optical recording medium according to a third exemplary embodiment of the present invention.

In the first and second exemplary embodiments, laser light is emitted to the optical disc 16 by using the communication opening 18A of the cartridge 18 and the opening 64B of the cartridge 64 provided for removal and insertion of the optical disc 16, respectively. On the other hand, in the third exemplary embodiment, an opening 18B for measurement is provided in the cartridge 18 and laser light is emitted to the optical disc 16 through the opening 18B, as shown in FIG. 7.

In the third exemplary embodiment, the warpage angle measurement apparatus 60 of the second exemplary embodiment is used for measuring the optical recording medium 10 of the first exemplary embodiment and the opening 18B for measurement is formed in the cartridge 18. Except for the above, the third exemplary embodiment is in common with the first and second exemplary embodiments. Therefore, the common components of the optical recording medium and the warpage angle measurement apparatus are labeled with the same reference numerals as those in FIGS. 1, 2, and 5 and the description thereof is omitted. The method for measuring an angle of warpage of the optical disc 16 is also the same as that in the first embodiment and therefore the description thereof is omitted.

As described above, the opening 18B for measurement is provided in the cartridge 18. Thus, warpage of the optical disc can be measured irrespective of the shape of the cartridge. Moreover, the warpage at a desired position of the optical disc can be measured.

In the first to third exemplary embodiments, the mounting posture adjusting mechanism 28 includes the rotating and driving mechanism 48. However, the present invention is not limited thereto. For example, in the case where a variation in warpage of the optical disc in the circumferential direction does not become a problem, the rotating and driving mechanism may be omitted.

In the first to third exemplary embodiments, the mounting posture adjusting mechanism 28 includes the screw members 46, the supporting columns 42, and the like. However, the present invention is not limited thereto. The structure of the mounting posture adjusting mechanism is not specifically limited, as long as it can adjust the mounting posture of the optical disc in the cartridge.

In the first to third exemplary embodiments, each of the warpage angle measurement apparatuses 10 and 60 includes the mounting posture adjusting mechanism 28 for adjusting the mounting posture of the optical disc 16 in the cartridge 18 or 64 in the constant temperature chamber 21. However, the present invention is not limited thereto. In the case where an effect of contact of the optical disc and the cartridge with each other on the angle of warpage of the optical disc can be ignored, no mounting posture adjusting mechanism may be provided. In this case, the angle of warpage of the optical disc may be measured while only one of the optical disc and the cartridge is held, for example.

In the first to third exemplary embodiments, the through holes 22B and 22D of the constant temperature chamber 21 are closed with the light-transmitting member 36. However, the present invention is not limited thereto. For example, in the case where the constant temperature chamber 21 has sufficient heating and cooling capabilities and it is possible to adjust the environmental condition inside the constant temperature chamber 21 even when the through holes 22B and 22D are opened, the light-transmitting member 36 may be omitted and the through holes 22B and 22D may be opened.

In the first to third exemplary embodiments, the temperature is adjusted as the environmental condition inside the constant temperature chamber 21. However, the present invention is not limited thereto. For example, another environmental condition such as a humidity may be adjusted so as to measure the angle of warpage of the optical disc.

In the first to third exemplary embodiments, the laser oscillator 24 and the light-receiving unit 26 are arranged outside the constant temperature chamber 21. However, the present invention is not limited thereto. For example, in the case where a range within which the temperature inside the constant temperature chamber 21 can be adjusted is close to a room temperature and the optical disc is not rapidly heated or cooled even when being placed in the constant temperature chamber 21, the laser oscillator 24 and the light-receiving unit 26 can be arranged inside the constant temperature chamber 21. In this case, the constant temperature chamber 22 may have a structure in which the through holes 22B and 22D are omitted.

In the first to third exemplary embodiments, two constant temperature chambers 21 are prepared, the temperatures in those constant temperature chambers 21 are set to be different from each other, the optical recording medium 20 (62) is accommodated in one of the constant temperature chamber 21 and is then carried into the other constant temperature chamber 21, and thereafter the angle of warpage of the optical disc 16 is measured. However, the present invention is not limited thereto. For example, in the case of measuring the angle of warpage occurring when the temperature is changed from the room temperature to a high temperature or a low temperature, only one constant temperature chamber 21 may be prepared, the inside of the constant temperature chamber 21 may be adjusted to a temperature different from the room temperature, the optical recording medium 20 (62) may be carried into the constant temperature chamber 21 after being left in the environment of the room temperature outside the constant temperature chamber 21, and then the angle of warpage of the optical disc 16 may be measured.

In the first to third exemplary embodiments, the angle of warpage of the optical disc 16 mounted on the cartridge 18 (64) is measured. However, the present invention is not limited thereto. It is possible to measure an angle of warpage of an optical disc itself caused by a rapid temperature change or a rapid humidity change in a short time, while the optical disc is not mounted in the cartridge.

In the first to third exemplary embodiments, the optical disc 16 having the light-transmitting layer 14 thinner than the substrate 12 is an object to be measured. However, the present invention is not limited thereto. It is also possible to measure an angle of warpage caused by a rapid temperature change or a rapid humidity change in a short time for another type of optical disc such as DVD in which a substrate and a light-transmitting layer have the same thickness and CD in which a substrate serves as a light-transmitting layer.

In the first to third exemplary embodiments, the angle of warpage of the optical disc 16 is measured. However, the present invention is not limited thereto. An angle of warpage of a cartridge for an optical disc caused by a rapid temperature change or a rapid humidity change in a short time can be also measured.

INDUSTRIAL APPLICABILITY

According to the present invention, it is possible to measure an angle of warpage of an optical disc and a cartridge for the optical disc caused by a rapid change in a temperature or a humidity occurring in a short time. Thus, the present invention can contribute to development of a highly reliable optical recording medium in which warpage of the optical disc and the cartridge for the optical disc can be suppressed.

What is claimed is:

1. A warpage angle measurement method comprising:
    accommodating at least one of an optical disc and a cartridge for the optical disc as an object to be measured in a first constant temperature chamber;
    adjusting an inside of the first constant temperature chamber to have a predetermined environmental condition including at least one of a temperature and a humidity;
    preparing a second constant temperature chamber, wherein the environmental conditions inside the first constant temperature chamber and the second constant temperature chamber are adjusted to have a different environmental condition from each other, and
    the object to be measured is first accommodated in the first constant temperature chamber and then carried into the second constant temperature chamber; and
    thereafter, measuring an angle of warpage of the object to be measured by emitting laser light to the object to be measured, receiving the laser light reflected from the object to be measured, and detecting a relative angle of an optical path of the reflected laser light with respect to an optical path of the emitted laser light.

2. The warpage angle measurement method according to claim 1, wherein the optical disc and the cartridge are held in the first and second constant temperature chambers while the optical disc is mounted in the cartridge, further comprising adjusting a mounting posture of the optical disc in the optical disc for measuring of the angle of warpage of the optical disc.

3. The warpage angle measurement method according to claim 1, wherein the angle of warpage of the optical disc is measured while the optical disc is driven to rotate.

4. The warpage angle measurement method according to claim 1, wherein the laser light is emitted to the optical disc through an opening for transmitting information of the optical disc provided in the cartridge while the optical disc is mounted in the cartridge, and the reflected laser light from the optical disc is reflected to an outside of the cartridge.

5. The warpage angle measurement method according to claim 1, wherein an opening for measurement is formed in the cartridge, the laser light is emitted to the optical disc through the opening for measurement while the optical disc is mounted in the cartridge, and the reflected laser light from the optical disc is reflected to an outside of the cartridge.

* * * * *